United States Patent
Dekker et al.

(10) Patent No.: US 12,061,384 B2
(45) Date of Patent: Aug. 13, 2024

(54) INTEGRATED-OPTICS-BASED COMPOSITE PHASE CONTROLLER OPERATIVE FOR THERMAL-BASED AND STRESS-BASED PHASE TUNING OF A SURFACE WAVEGUIDE

(71) Applicant: LioniX International BV, Enschede (NL)

(72) Inventors: Ronald Dekker, Enschede (NL); Ruud Michiel Oldenbeuving, Enschede (NL); Dimitri Geskus, Enschede (NL); René Gerrit Heideman, Oldenzaal (NL)

(73) Assignee: LioniX International BV, Enschede (NL)

( * ) Notice: Subject to any disclaimer, the term of this patent is extended or adjusted under 35 U.S.C. 154(b) by 340 days.

(21) Appl. No.: 17/743,853

(22) Filed: May 13, 2022

(65) Prior Publication Data
US 2022/0365376 A1   Nov. 17, 2022

Related U.S. Application Data

(60) Provisional application No. 63/280,877, filed on Nov. 18, 2021, provisional application No. 63/189,538, filed on May 17, 2021.

(51) Int. Cl.
  *G02F 1/01* (2006.01)
  *G02F 1/21* (2006.01)
  *G02F 1/225* (2006.01)

(52) U.S. Cl.
  CPC .......... *G02F 1/0128* (2013.01); *G02F 1/0147* (2013.01); *G02F 1/212* (2021.01); *G02F 1/225* (2013.01)

(58) Field of Classification Search
  CPC ...... G02F 1/0128; G02F 1/0147; G02F 1/212; G02F 1/225; G02F 1/0134
  See application file for complete search history.

(56) References Cited

U.S. PATENT DOCUMENTS

4,684,215 A * 8/1987 Shaw ................... G02B 6/2821
                                                                  385/40
6,185,345 B1 * 2/2001 Singh ................. G02B 6/12007
                                                                  385/24
(Continued)

OTHER PUBLICATIONS

Grigory Lihachev et al., "Ultralow-noise frequency-agile photonic integrated lasers", Jul. 15, 2021, 26 pp.
(Continued)

*Primary Examiner* — Andrew Jordan
(74) *Attorney, Agent, or Firm* — Kaplan Breyer Schwarz, LLP

(57) ABSTRACT

The instant disclosure is directed toward integrated-optics-based composite phase controllers that include at least one thermo-optic (TO) phase controller and at least one stress-optic (SO) phase controller, each of which is configured to affect the phase, or other propagation characteristic, of a light signal travelling through a surface waveguide. The SO phase controller can induce a small phase change quickly, while the TO phase controller can slowly induce a larger phase change. Embodiments are particularly well suited for use in waveguide-based resonant elements, such as ring resonators, spectral filters, and the like. Furthermore, photonic systems comprising one or more composite phase controllers can be developed, such as wavelength-tunable lasers for applications such as LiDAR, chemical/biological sensing, medical diagnostics, and optical communications.

19 Claims, 10 Drawing Sheets

(56) References Cited

U.S. PATENT DOCUMENTS

| | | | | |
|---|---|---|---|---|
| 9,221,074 | B2 * | 12/2015 | Heideman | B05D 1/36 |
| 2001/0046363 | A1 | 11/2001 | Purchase et al. | |
| 2006/0263098 | A1 * | 11/2006 | Akiyama | H04B 10/66 |
| | | | | 398/188 |
| 2015/0110441 | A1 * | 4/2015 | Heideman | G02F 1/0134 |
| | | | | 385/14 |
| 2018/0203262 | A1 * | 7/2018 | Epping | G02F 1/225 |
| 2019/0171043 | A1 | 6/2019 | Epping et al. | |
| 2022/0365376 | A1 * | 11/2022 | Dekker | G02F 1/0134 |
| 2023/0152608 | A1 * | 5/2023 | Heideman | G02F 1/225 |
| | | | | 385/3 |
| 2024/0061308 | A1 * | 2/2024 | Yen | G02F 1/225 |

OTHER PUBLICATIONS

Epping et al, Ultra-low-power stress-based integrated photonic phase actuator, Jun. 27, 2017, XP055653045.
Exner, Karin, International Search Report and Written Opinion issued in PCT Patent Application No. PCT/IB2022/061113 mailed on Feb. 2, 2023.
Tsia et al, Electrical tuning of birefringence in silicon waveguides, Feb. 11, 2008, Applied Physics Letters; XP55571982, vol. 92 / No. 6.

* cited by examiner

INTEGRATED-OPTICS-BASED COMPOSITE PHASE CONTROLLER OPERATIVE FOR THERMAL-BASED AND STRESS-BASED PHASE TUNING OF A SURFACE WAVEGUIDE

CROSS REFERENCE TO RELATED APPLICATIONS

This case claims priority of U.S. Provisional Patent Application Ser. No. 63/189,538, filed May 17, 2021 and 63/280,877, filed Nov. 18, 2021, each of which is incorporated herein by reference. If there are any contradictions or inconsistencies in language between this application and one or more of the cases that have been incorporated by reference that might affect the interpretation of the claims in this case, the claims in this case should be interpreted to be consistent with the language in this case.

TECHNICAL FIELD

The present disclosure relates to integrated optics in general and, more specifically, to phase controllers for controlling a propagation characteristic, such as phase, speed of propagation, and the like, of an optical signal propagating in a surface waveguide.

BACKGROUND

A Planar Lightwave Circuit (PLC) is an optical system comprising one or more integrated-optics-based waveguides that are disposed on the surface of a substrate, where the waveguides are typically combined to provide complex optical functionality. These "surface waveguides" typically include a core of a first material that is surrounded by a second material having a refractive index that is lower than that of the first material. The change in refractive index at the interface between the materials enables reflection of light propagating through the core, thereby guiding the light along the length of the surface waveguide.

PLC-based devices and systems have made significant impact in many applications, such as optical communications systems, sensor platforms, solid-state projection systems, and the like. Surface-waveguide technology satisfies a need in these systems for small-sized, reliable optical circuit components that can provide functional control over a plurality of optical signals propagating through a system. Examples include simple devices (e.g., 1×2 and 2×2 optical switches, Mach-Zehnder interferometer-based sensors, etc.), as well as more complex, matrix-based systems having multiple surface waveguide elements and many input and output ports (e.g., wavelength add-drop multiplexers, cross-connects, wavelength combiners, etc.).

Common to many such systems is a need for a switching element. Historically, the most common switching elements suitable for use in a PLC are based on a device known as a thermo-optic (TO) phase controller. A TO phase controller takes advantage of the fact that the refractive index (i.e., the speed of light in a material) is temperature-dependent (referred to as the thermo-optic effect) by including a thin-film heater that is disposed on the top of the upper cladding of a surface waveguide. Electric current passed through the heater generates heat that propagates into the cladding and core materials, changing their temperature and, thus, their refractive indices. TO phase controllers have demonstrated induced phase changes greater than $2\pi$.

To form an optical switching element, a TO phase controller is typically included in a surface waveguide element, such as a Mach-Zehnder interferometer (MZI). In an MZI switch arrangement, an input optical signal is split into two equal parts that propagate down a pair of substantially identical paths (i.e., arms) to a junction where they are then recombined into an output signal. One of the arms incorporates a TO phase controller that controls the phase of the light in that arm. By imparting a phase difference of $\pi$ between the light-signal parts in the arms, the two signals destructively interfere when recombined, thereby canceling each other out to result in a zero-power output signal. When the phase difference between the light-signal parts is 0 (or $n*2\pi$, where n is an integer), the two signals recombine constructively resulting in a full-power output signal.

Unfortunately, TO phase controllers are too slow for many applications because waveguide materials normally have low thermal conductivity coefficients. As a result, the time required to heat or cool a surface waveguide structure can be very long (for example, 250 microseconds for a glass-based waveguide).

More recently, stress-optic phase tuning capability exploiting the photo-elastic effect has been demonstrated by incorporating a piezoelectric element disposed on a surface waveguide structure. Examples of such stress-optic (SO) phase controllers are disclosed in, for example, U.S. Pat. Nos. 9,221,074 and 9,764,352, each of which is incorporated herein by reference.

While SO phase controllers are capable of inducing a $2\pi$ phase shift on an optical signal in microseconds (and possibly nanoseconds), they require higher voltages than thermo-optic phase controllers and significantly greater interaction lengths over which the stress is induced in a surface waveguide. For instance, while a thermo-optic phase controller might require an interaction length of approximately 1 mm to induce a $2\pi$ phase shift, the required interaction length for a comparable SO phase controller might be as long as 2.1 cm, or 21 times that of the thermo-optic phase controller.

The need for a fast, space-efficient approach to phase control of a light signal propagating in a surface waveguide remains, as yet, unmet in the prior art.

SUMMARY

The present disclosure is directed toward devices for controlling the phase of a light signal propagating through an integrated-optics-based waveguide, where such a controller has two control mechanisms—a fast fine-tuning mechanism and a slow coarse-tuning mechanism. Embodiments in accordance with the present disclosure are particularly well suited for use in applications such LiDAR, optical sensors, optical communications systems, medical diagnostic systems, and the like.

The present disclosure provides an advance over the prior art by combining a stress-optic phase controller and a thermo-optic phase controller, each of which is operatively coupled with an integrated-optics-based waveguide disposed on a substrate, where each phase controller is operative for affecting the phase of a light signal propagating through the waveguide. The thermo-optic phase controller provides slow tuning of the phase over a large phase range, while the stress-optic phase controller simultaneously provides fast tuning over a smaller phase range.

An illustrative embodiment is a composite phase controller that includes a waveguide having a planar top surface, an SO phase controller disposed on the waveguide, and a TO phase controller disposed on the SO phase controller.

The SO phase controller includes a pair of electrodes and a piezoelectric element located between the electrodes. Upon application of a drive signal to the electrodes, the SO phase controller imparts a significant stress in the materials of the waveguide, thereby changing the refractive index of the waveguide materials. The refractive-index change changes the propagation characteristics of the waveguide and the phase of a light signal propagating through it. Since stress can be induced quickly, the phase change can be realized very quickly as well. However, the amount of stress that can be induced is limited; therefore, the amount of phase change that can be easily induced is also limited.

The TO phase controller includes an ohmic heater that is thermally coupled with the waveguide. Upon application of a drive current through the heater, the temperature of the waveguide materials is changed, thereby changing the refractive index of the waveguide materials. The refractive-index change affects the propagation characteristics of the waveguide and the phase of a light signal propagating through it. Since a large temperature change can be induced in the waveguide, a large phase change can be realized. However, typical waveguide materials have poor thermal conductivity; therefore, such a phase change can only be slowly realized.

The heater and piezoelectric actuator are electrically isolated by a dielectric layer located between them.

In some embodiments, the heater is between the ring resonator and the piezoelectric actuator.

In some embodiments, each ring resonator structure is configured such that the heater and piezoelectric actuator are located in substantially the same plane, where the heater resides on (or near) a first portion of the circumference of the ring and the piezoelectric actuator is disposed on (or near) a second portion of the circumference of the ring. In some such embodiments, the phase controllers are laterally displaced from one another such that one of the stress-optic and thermo-optic phase controllers is at least partially "nested" within the other and both phase controllers are operatively coupled with the resonant element. In some embodiments, at least one electrode is shared between the stress-optic phase controller and thermo-optic phase controller.

In some embodiments, the waveguide is included in a resonant element, such as a ring resonator. As a result, the composite phase controller can be used to control the spectral response of the resonant element.

An exemplary system embodiment that includes a composite phase controller is a hybrid tunable laser suitable for use in a LiDAR system. The tunable laser includes a gain chip that is optically coupled using hybrid integration with a PLC chip that includes a waveguide mirror. The waveguide mirror includes an integrated-optics-based Vernier filter comprising a pair of ring resonators, each included in a different composite phase controller. The gain cavity of the tunable laser is defined by a first mirror comprising a polished facet of the gain chip and the Vernier-filter-based waveguide mirror on the PLC. The wavelength of the laser can be tuned over the entire free-spectral range of the Vernier filter by providing appropriate drive signals to the composite phase controllers.

Another exemplary system embodiment is an optical switch/variable optical attenuator based on a Mach-Zehnder Interferometer that includes a composite phase controller in one of its arms.

An embodiment in accordance with the present disclosure is an apparatus comprising a composite phase controller including: a first waveguide disposed on a substrate; a first stress-optic (SO) phase controller that is disposed on the first waveguide and configured to control a first stress in the first waveguide, wherein the first SO phase controller includes a first piezoelectric element disposed between a first pair of electrodes; and a first thermo-optic (TO) phase controller disposed on the first waveguide and configured to control a first temperature of the first waveguide.

Another embodiment in accordance with the present disclosure is a method comprising: providing a first composite phase controller that includes: a first waveguide disposed on a substrate; a first stress-optic (SO) phase controller that is disposed on the first waveguide and configured to control a first stress in the first waveguide, wherein the first SO phase controller includes a first piezoelectric element disposed between a first pair of electrodes; and a first thermo-optic (TO) phase controller disposed on the first waveguide and configured to control a first temperature of the first waveguide; optically coupling a first light signal into the first waveguide; and controlling at least one of the first SO phase controller and first TO phase controller to control a propagation characteristic of the first light signal in the first waveguide.

DETAILED DESCRIPTION

For the purposes of the present Specification, including the appended claims, the following terms are defined:

"Disposed on" and "Formed on" are defined as "exists on" an underlying material or layer either in direct physical contact or with one or more intervening layers. For example, if a material is described to be "disposed (or grown) on a substrate," this can mean that either (1) the material is in intimate contact with the substrate; or (2) the material is in contact with one or more layers that already reside on the substrate. It should be noted that a conformal layer is considered disposed on each surface of a structure to which it conforms; and "integrated-optics waveguide," "surface waveguide," and "waveguide" are used interchangeably and defined to mean a PLC-based waveguiding structure comprising a lower cladding layer, a core, and an upper cladding layer formed on a surface of a substrate.

Figure 1:
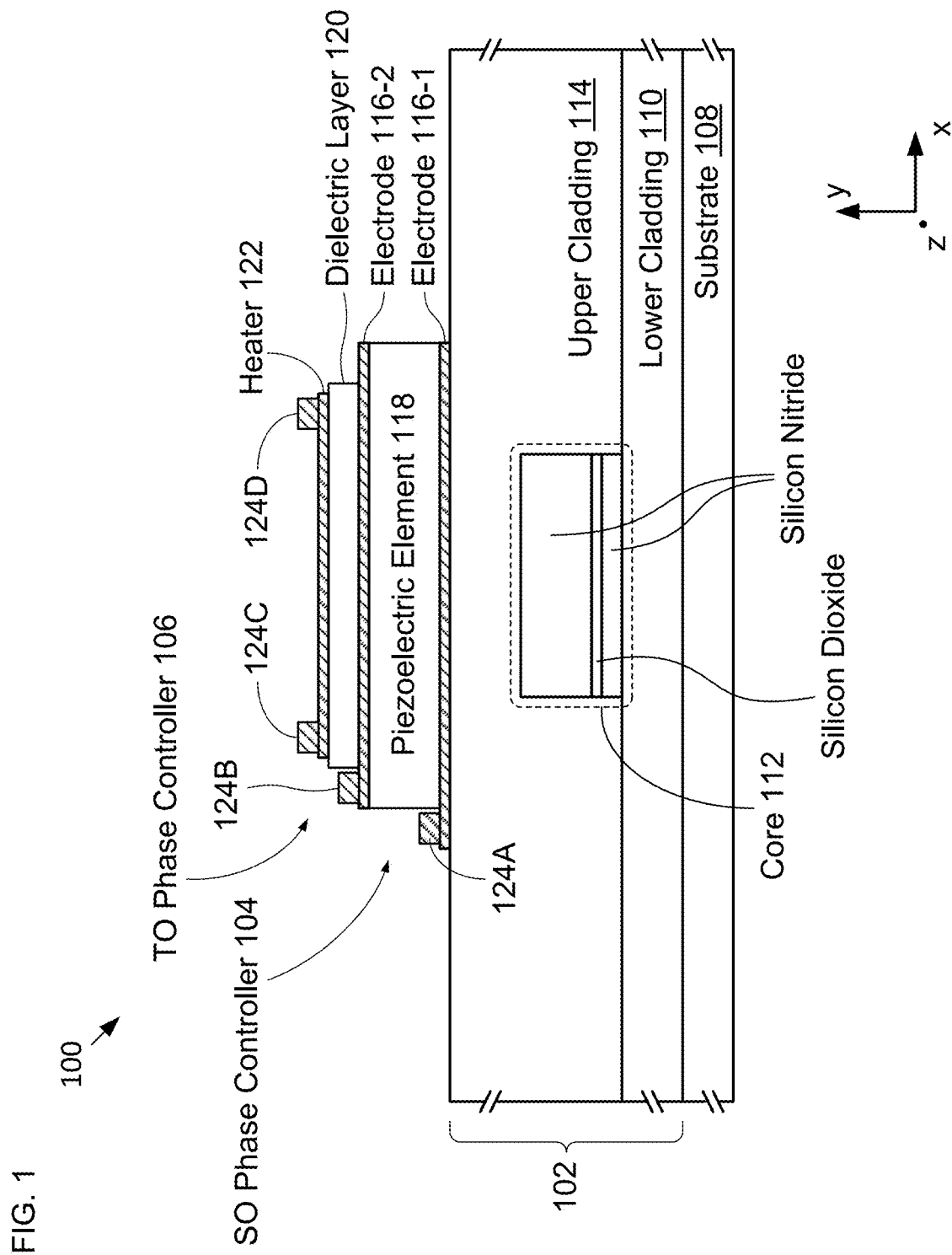
FIG. 1 depicts a schematic drawing of a cross-sectional view of a composite phase controller in accordance with the present disclosure.

FIG. 1 depicts a schematic drawing of a cross-sectional view of a composite phase controller in accordance with the present disclosure. Phase controller 100 includes waveguide 102, stress-optic phase controller 104, and thermo-optic phase controller 106.

Figure 2:
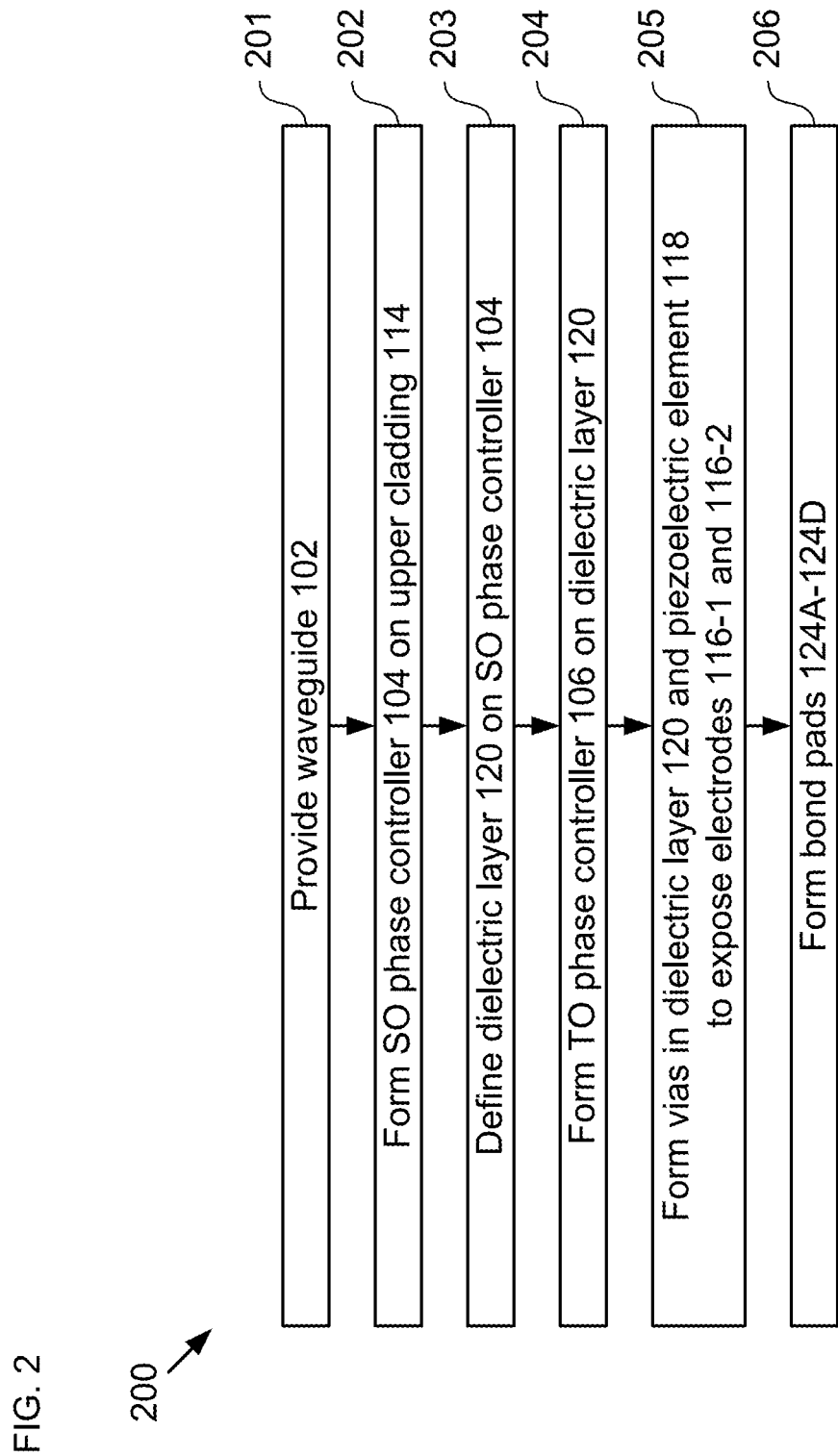
FIG. 2 depicts operations of an exemplary method suitable for forming a composite phase controller in accordance with the present disclosure.

FIG. 2 depicts operations of an exemplary method suitable for forming a composite phase controller in accordance with the present disclosure. Method 200 is described herein with continuing reference to FIG. 1 as well as reference to FIGS. 3A-C. Method 200 begins with operation 201, wherein waveguide 102 is provided.

Waveguide 102 is a high-index-contrast waveguide that includes lower cladding 110, core 112, and upper cladding 114, all of which are disposed on underlying substrate 108.

In the depicted example, waveguide 102 is a multilayer-core waveguide (commonly referred to as a TriPleX Waveguide™) comprising upper and lower cladding layers of silicon dioxide that surround core 112. Core 112 is a multi-layer core comprising lower and upper layers of silicon nitride and a central layer of silicon dioxide, which are configured such that they collectively support single-mode propagation of a single optical mode. Examples of multi-layer core waveguides suitable for use in accordance with the present disclosure are described in U.S. Pat. Nos. 7,146,087, 7,142,317, 9,020,317, 9,221,074, and 9,764,352, each of which is incorporated herein by reference. Such a waveguide structure is preferred in some embodiments because it enables low propagation loss over a wide spectral range and can be readily tapered in one or two dimensions to control the shape of the mode field propagating through it. However, any of myriad alternative waveguide types (e.g., silica on silicon, single-core waveguides, silicon waveguides, etc.) can be used in waveguide 102 without departing from the scope of the present disclosure.

At operation 202, stress-optic phase controller 104 (hereinafter referred to as SO phase controller 104) is formed on the top surface of the upper cladding layer of waveguide 102.

Figure 3A:
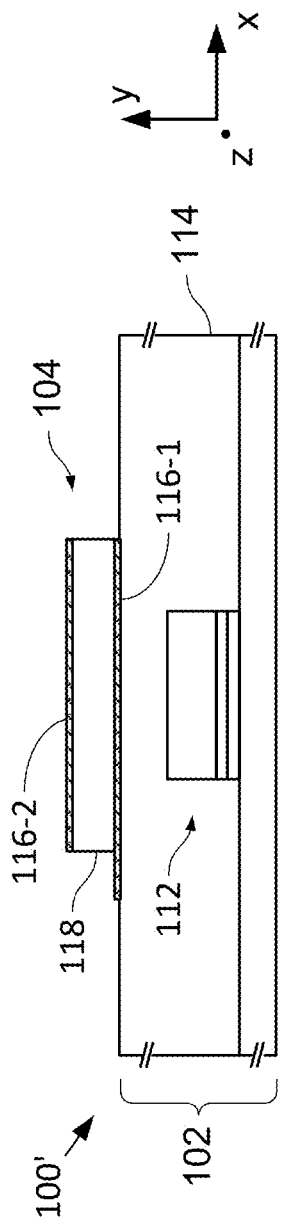
FIG. 3A depicts a schematic drawing of a cross-sectional view of nascent composite phase controller 100' after the formation of SO phase controller 104 on upper cladding 114.

FIG. 3A depicts a schematic drawing of a cross-sectional view of nascent composite phase controller 100' after the formation of SO phase controller 104 on upper cladding 114.

SO phase controller 104 includes electrodes 116-1 and 116-2 and piezoelectric element 118, which resides between electrodes 116-1 and 116-2.

Each of electrodes 116-1 and 116-2 is an electrically conductive structure comprising an adhesion layer and a highly conductive layer. In the depicted example, each of electrodes 116-1 and 116-2 includes titanium and platinum and has a combined thickness of approximately 100 nm.

Piezoelectric element 118 is a layer of lead zirconate titanate (PZT) having a thickness of approximately 2 microns. In some embodiments, piezoelectric element 118 comprises a different piezoelectric material and/or a different thickness. It should be noted that any suitable piezoelectric material and/or thickness can be used in piezoelectric element 118 without departing from the scope of the present disclosure.

SO phase controller 104 is configured to induce one or more stress fields in the layers of waveguide 102—specifically, core 112, thereby inducing a refractive index change in the core. By imparting a refractive-index change on the materials of waveguide 102, SO phase controller 104 induces a phase change on a light signal propagating through core 112. As will be appreciated by one skilled in the art, after reading this Specification, SO phase controller 104 can quickly induce a stress in the waveguide materials; however, the stress-induced refractive-index change is relatively small per unit length of the piezoelectric element.

At operation 203, dielectric layer 120 is formed such that it is disposed on top of SO phase controller 104. In the depicted example, dielectric layer 120 is defined by forming a full-surface layer and patterning it in conventional fashion. In some embodiments, dielectric layer 120 is formed via direct patterning, such as evaporation through a shadow mask. It should be noted that myriad methods for defining dielectric layer 120 can be used without departing from the scope of the present disclosure.

Dielectric layer 120 is a layer of electrically insulating material configured to electrically isolate electrodes 116-1 and 116-2 from thermo-optic phase controller 106 (hereinafter referred to as TO phase controller 106) once it is formed. In the depicted example, dielectric layer 120 comprises silicon dioxide; however, any suitable electrically insulating material can be used in dielectric layer 120 without departing from the scope of the present disclosure.

At operation 204, TO phase controller 106 is formed on dielectric layer 120.

TO phase controller 106 is a thermo-optic phase control element comprising heater 122, which is a patterned thin metal film disposed on waveguide 102. In the depicted example, heater 122 is a layer of platinum having a thickness of approximately 100 nm; however, any suitable material and/or thickness can be used in heater 122 without departing from the scope of the present disclosure.

When electric current passes through heater 122, it generates heat that propagates into the cladding and core materials of waveguide 102, changing their temperature and, via the thermo-optic effect, inducing a refractive-index change in the materials. As will be appreciated by one skilled in the art, after reading this Specification, TO phase controller 106 can induce a large refractive-index change; however, due to the long thermal time constants of typical waveguide materials, such refractive-index changes occur relatively slowly.

Figure 3B:
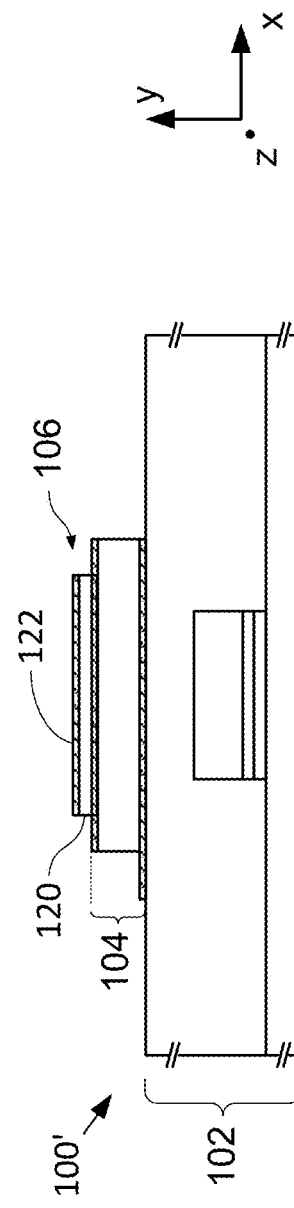
FIG. 3B depicts a schematic drawing of a cross-sectional view of nascent composite phase controller 100' after the formation of TO phase controller 106 on dielectric layer 120.

FIG. 3B depicts a schematic drawing of a cross-sectional view of nascent composite phase controller 100' after the formation of TO phase controller 106 on dielectric layer 120.

At operation 205, vias are formed through dielectric layer 120 and piezoelectric element 118 to expose electrodes 116-1 and 116-2.

At operation 206, contacts 124A through 124D are formed on electrodes 116-1 and 116-2 and heater 122.

Figure 3C:
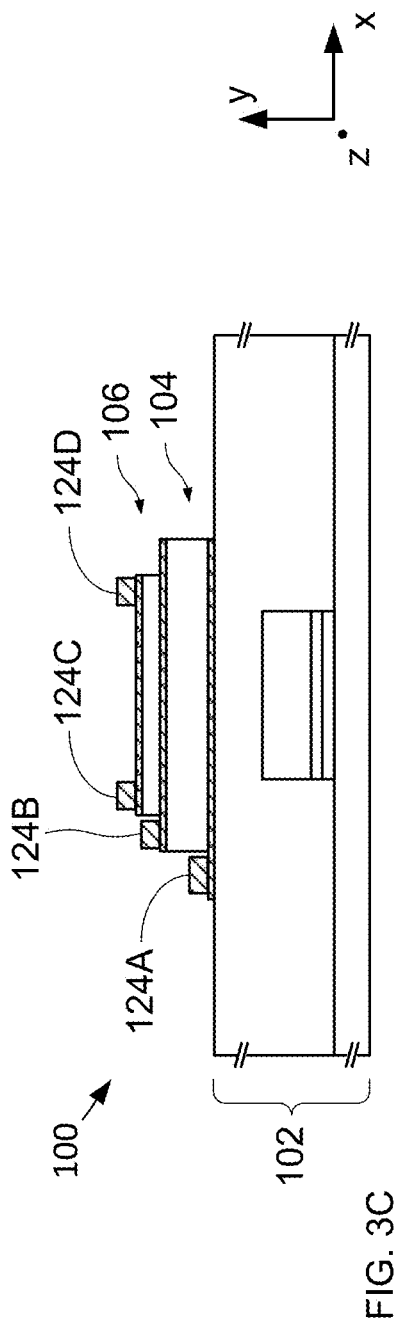
FIG. 3C depicts a schematic drawing of a cross-sectional view of completed composite phase controller 100 after the formation of contacts 124A through 124D.

FIG. 3C depicts a schematic drawing of a cross-sectional view of completed composite phase controller 100 after the formation of contacts 124A through 124D.

Although the depicted example includes a waveguide having a substantially planar top cladding, in some embodiments, a composite phase controller includes a waveguide whose top cladding comprises a raised portion (e.g., a projection, pedestal, ridge, etc.) on which at least a stress-optic phase controller is disposed. Such an arrangement can give rise to an enhanced stress-optic effect, while also enabling control over bimodal refringence by inducing specific, controlled stress tensors in the vertical and horizontal directions.

Figure 4:
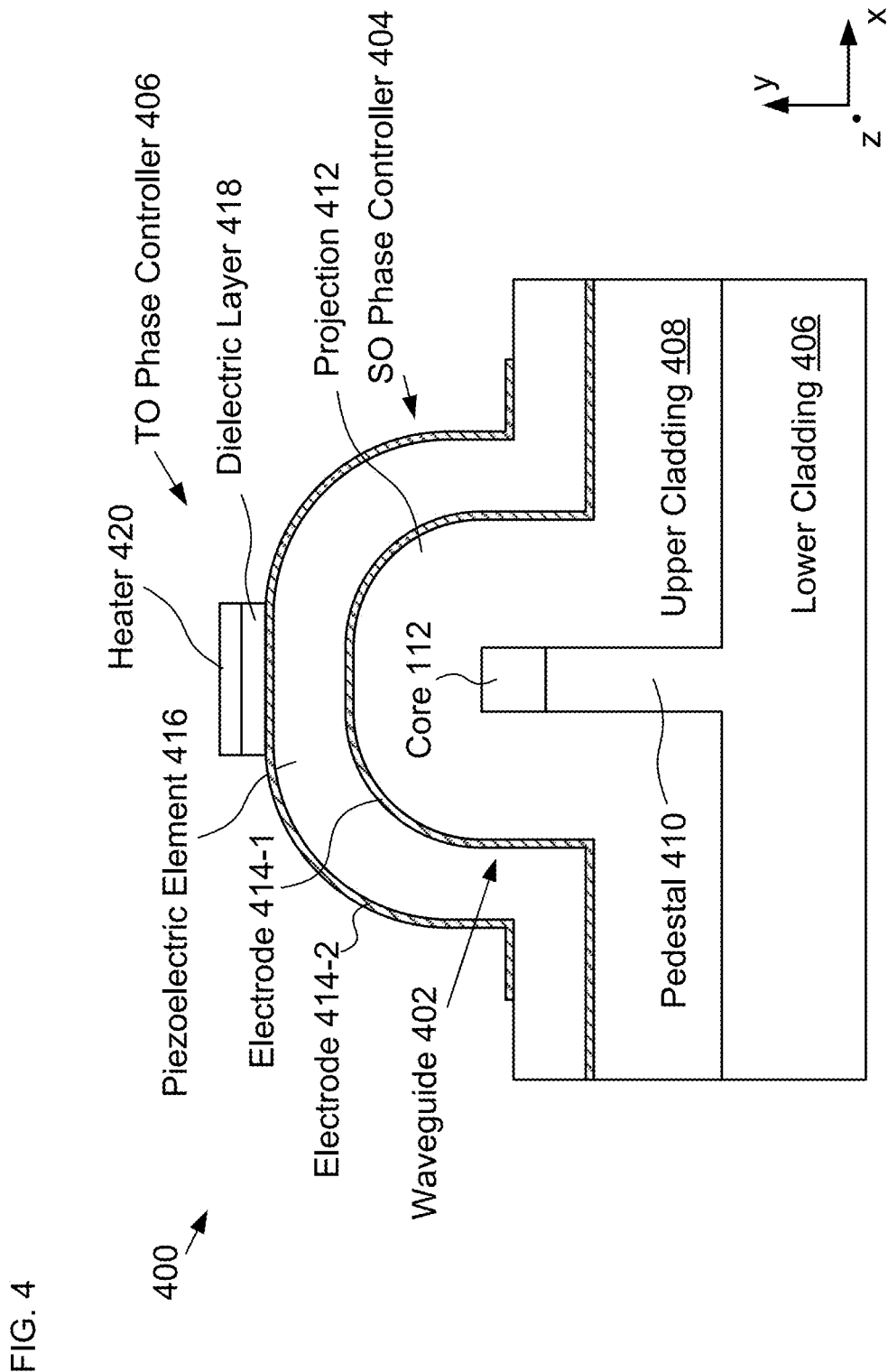
FIG. 4 depicts a schematic drawing of a cross-sectional view of a first alternative composite phase controller in accordance with the present disclosure.

FIG. 4 depicts a schematic drawing of a cross-sectional view of a first alternative composite phase controller in accordance with the present disclosure. Composite phase controller 400 includes surface waveguide 402, SO phase controller 404, and TO phase controller 406.

Waveguide 402 is analogous to waveguide 102; however, waveguide 402 comprises lower cladding 406, core 112, and upper cladding 408.

Lower cladding 406 includes pedestal 410, which projects upward from a field region of the lower cladding.

Core 112 resides on the top surface of pedestal 410.

Upper cladding 408 is a conformal layer disposed on pedestal 410 and core 112 such that the pedestal, core, and upper cladding collectively define projection 412, which projects above a field region of the upper cladding.

SO phase controller 404 is disposed on projection 412 such that each of electrode 414-1, piezoelectric element 416, and electrode 414-2 reside on the top and side surfaces of the projection. As a result, when a control signal is applied to the electrodes, piezoelectric element 416 imparts both laterally directed stress and vertically directed stress, where the ratio of vertical and lateral stress is based on the configuration of projection 412 and at least some of electrode 414-1, piezoelectric element 416, and electrode 414-2. Examples of stress-optic phase controllers suitable for use in accordance with the present disclosure are described in detail in U.S. Pat. Nos. 10,241,352 and 10,437,081, each of which is incorporated herein by reference.

Dielectric layer 418 is analogous to dielectric layer 120.

Heater 420 is analogous to heater 122.

Dielectric layer 418 and heater 420 are disposed on the top surface of SO phase controller 404 such that heat generated by the heater can couple into at least some of the layers of waveguide 402. In some embodiments, at least one of dielectric layer 418 and heater 420 extends, at least partially, down the sides of projection 412.

Although the configuration of each of the composite phase controllers described above includes a TO phase controller disposed on a SO phase controller, the order in which these phase controllers are formed can be reversed without departing from the scope of the present disclosure. In other words, in some embodiments, TO phase controller 106 (or 406) is disposed directly on an underlying waveguide, dielectric layer 120 (or 418) is disposed on the TO phase controller, and SO phase controller 104 (or 406) is disposed on the dielectric layer.

Furthermore, in some embodiments, the SO and TO phase controllers are substantially coplanar and laterally displaced from one another. In such embodiments, each of the TO and SO phase controllers is disposed on, or near, the underlying waveguide such that each phase controller is operatively coupled with the waveguide. In some embodiments, at least one of the TO and SO phase controllers is not disposed directly on the underlying waveguide but, rather, is laterally displaced from the waveguide by a small distance such that the TO and SO phase controllers are "nested." For example, in some embodiments, a TO phase controller is disposed over a first portion of the waveguide (any fraction of the waveguide up to approximately its entirety) and the SO phase controller is located outside and/or inside the circumference of the TO phase controller. In some embodiments, an SO phase controller is disposed over a first portion of the waveguide (any fraction of the waveguide up to approximately its entirety) and the TO phase controller is located outside and/or inside the circumference of the SO phase controller.

Figure 5A:
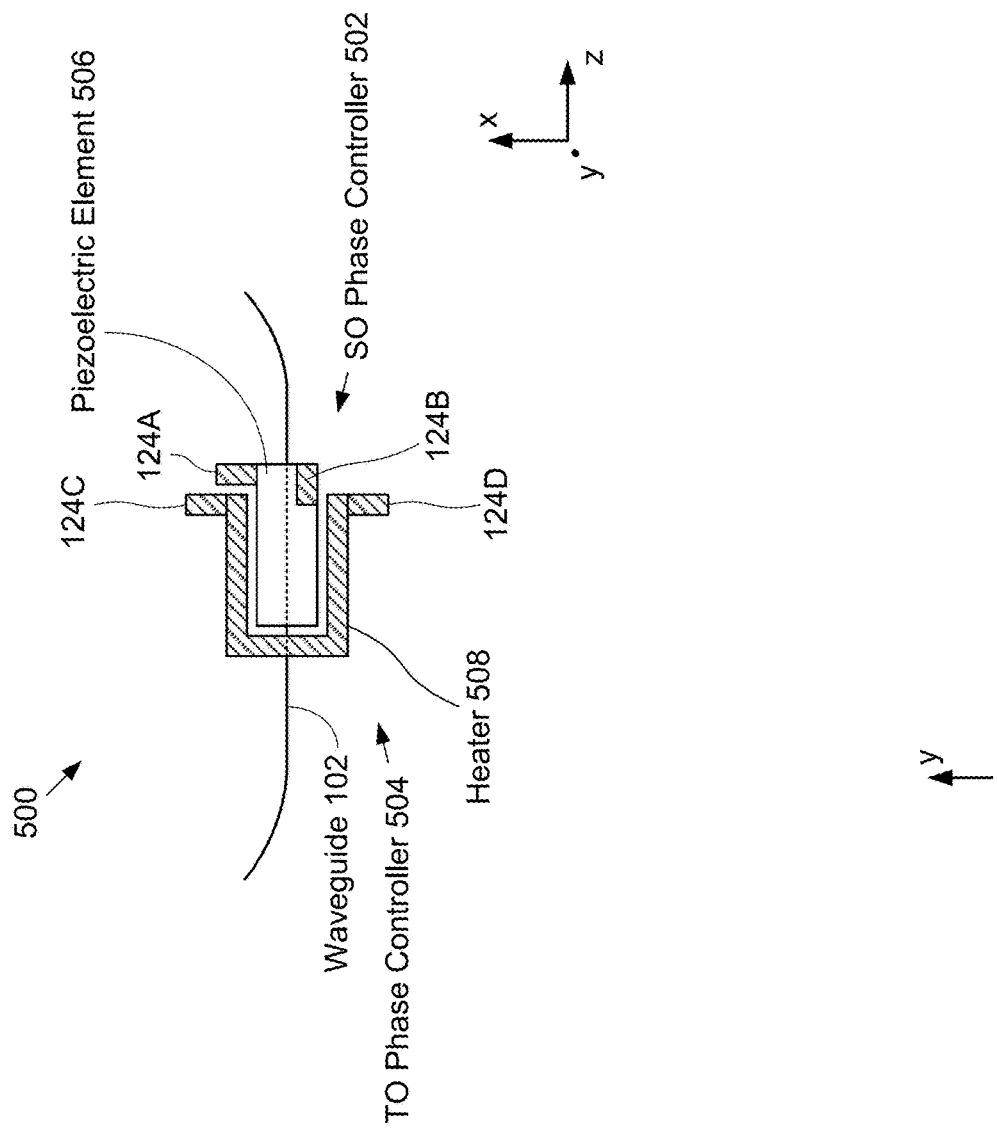
FIG. 5A depicts a schematic drawing of a cross-sectional view of a second alternative composite phase controller in accordance with the present disclosure.

FIG. 5A depicts a schematic drawing of a top view of a first example of a composite phase controller having substantially coplanar SO and TO phase controllers in accordance with the present disclosure. Composite phase controller 500 includes surface waveguide 102, SO phase controller 502, and TO phase controller 504.

SO phase controller 502 is analogous to SO phase controller 104 and includes piezoelectric element 506, which is analogous to piezoelectric element 118 described above.

TO phase controller 504 is analogous to TO phase controller 106 and includes heater 508, which is analogous to heater 122.

In the depicted example, heater 508 is configured such that it includes an interior region in which piezoelectric element 506 resides, thereby forming a "nested" composite phase controller.

Furthermore, because composite phase controller is disposed on a planar waveguide (i.e., waveguide 102), SO phase controller 502 and TO phase controller 504 are substantially coplanar. However, when a nested phase controller is formed on a waveguide that is not a planar waveguide (e.g., waveguide 402), at least some portions of its SO and TO phase controllers can be non-coplanar.

It should be noted that efforts to achieve fast tuning over a relatively small frequency range have been made in the prior art, such as those described by G. Lihachev, et al., in "Ultralow-noise frequency-agile photonic integrated lasers," arXiv: 2102.02990v1, which is incorporated herein by reference. In this work, a DFB diode laser having a single wavelength (determined by the design and fabrication of the laser structure) was coupled with a ring resonator comprising a piezoelectric actuator. Using the piezoelectric-actuated microring resonator to tune the laser cavity of the DFB laser, its output wavelength of the could be tuned slightly (i.e., over a very small wavelength range) around its design wavelength. The resonance of the ring resonator was aligned to the laser diode by changing the current through the diode. Unfortunately, in addition to enabling only an extremely narrow tuning range around a fixed wavelength, such an approach is complex and challenging to implement.

In contrast, the teachings of the present disclosure enable coarse tuning over a large frequency range via thermo-optic effect in conjunction with fast tuning over a small frequency range, which can be implemented in a more straightforward manner that mitigates or avoids many of the pitfalls associated with the work presented by Lihachev, et al.

Advantages afforded embodiments in accordance with the present disclosure include an ability to slowly coarse tune, and quickly fine tune, the effective path length of a waveguide element. This is particular advantageous when the waveguide element is included in a resonant element, such as a ring resonator-based spectral filter. This dual-phase-tuning capability affords systems employing a composite phase controller in accordance with the present disclosure significant advantages over the prior art. These advantages enable improved performance in myriad application areas, such as LiDAR, chemical and biological sensing, optical communications, and the like.

Furthermore, in some embodiments, the SO and TO phase controllers are substantially coplanar and laterally displaced from one another. In such embodiments, each of the TO and SO phase controllers is disposed on, or near, the underlying waveguide such that each phase controller is operatively coupled with the waveguide. In some embodiments, at least one of the TO and SO phase controllers is not disposed directly on the underlying waveguide but, rather, is laterally displaced from the waveguide by a small distance such that the TO and SO phase controllers are "nested." For example, in some embodiments, a TO phase controller is disposed over a first portion of the waveguide (any fraction of the waveguide up to approximately its entirety) and the SO phase controller is located outside and/or inside the circumference of the TO phase controller. In some embodiments, an SO phase controller is disposed over a first portion of the waveguide (any fraction of the waveguide up to approximately its entirety) and the TO phase controller is located outside and/or inside the circumference of the SO phase controller.

Figure 5B:
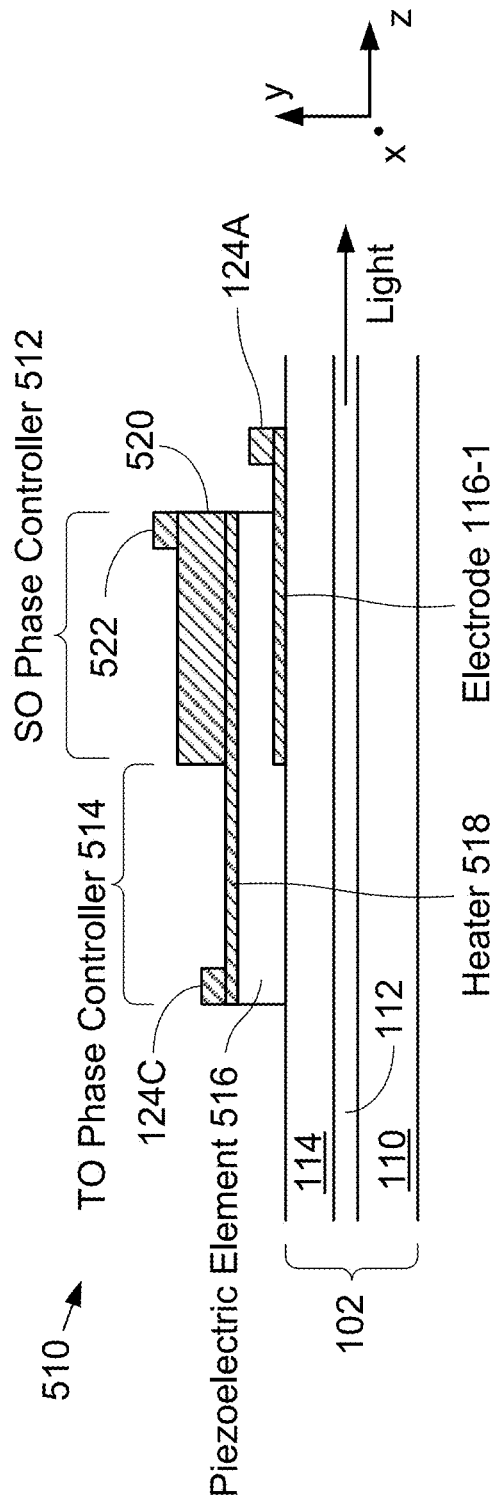
FIG. 5B depicts a schematic drawing of a cross-sectional view of a second example of a composite phase controller having substantially coplanar SO and TO phase controllers in accordance with the present disclosure.

FIG. 5B depicts a schematic drawing of a cross-sectional view of a second example of a composite phase controller having substantially coplanar SO and TO phase controllers in accordance with the present disclosure. Composite phase controller 510 includes surface waveguide 102, SO phase controller 512, and TO phase controller 514. SO phase controller 512 and TO phase controller 514 are arranged such that they are laterally displaced but contiguous along the axial direction of waveguide 102. Furthermore, SO phase controller 512 and TO phase controller 514 are electrically connected such that they share an electrode and bond pad.

SO phase controller 512 is analogous to SO phase controller 104 and includes piezoelectric element 516, electrode 116-1, and electrode 520. Bond pads 124A and 522 are electrically coupled with electrodes 116-1 and 520, respectively. Bond pad 522 is analogous to each of bond pads 124A-D.

Electrode 520 is a thick layer of electrically conductive material disposed on heater 518 in the region of the SO phase controller. As a result, electrode 520 has extremely low resistance. In the depicted example, electrode 520 comprises a layer of gold having a thickness of approximately 1 micron; however, any suitable material and/or thickness can be used for electrode 520.

TO phase controller 514 is analogous to TO phase controller 106 and includes heater 518, which his electrically connected between bond pad 124C and electrode 520. Heater 518 is analogous to heater 122 and is disposed on the top surface of piezoelectric element 516.

When a voltage differential is applied between bond pads 124C and 522, most of the voltage drop occurs within heater 518, outside of the region of electrode 520, thereby giving rise to a current flow through the heater and generating heat that is conducted into waveguide 120. Typically, bond pad 522 is electrically connected to ground; therefore, electrode 520 and the entire surface of piezoelectric element 518 is also typically at ground potential. In some embodiments, bond pad 522 is electrically connected to a voltage other than ground potential.

As discussed above, when a voltage potential is applied between bond pads 124A and 522, the piezoelectric material residing between electrodes 116-1 and 518 generates a stress in the materials of waveguide 102.

Figure 5C:
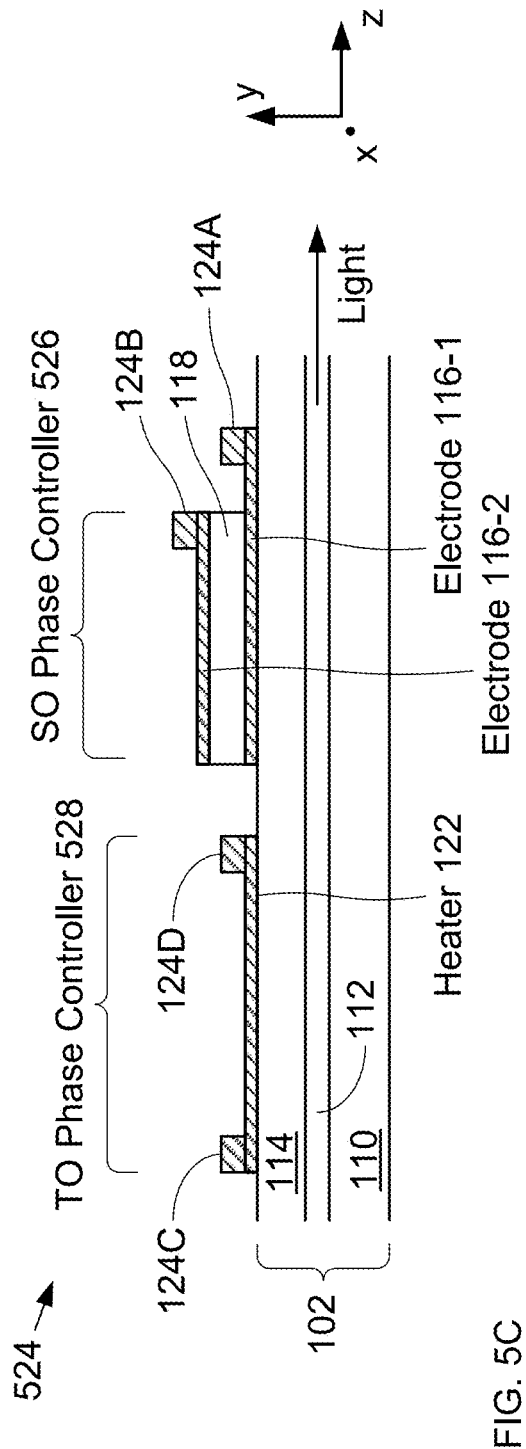
FIG. 5C depicts a schematic drawing of a cross-sectional view of a third example of a composite phase controller having substantially coplanar SO and TO phase controllers in accordance with the present disclosure.

FIG. 5C depicts a schematic drawing of a cross-sectional view of a third example of a composite phase controller having substantially coplanar SO and TO phase controllers in accordance with the present disclosure. Composite phase controller 510 includes surface waveguide 102, SO phase controller 526, and TO phase controller 528. SO phase controller 526 and TO phase controller 528 are arranged such that they are laterally displaced along the axial direction of waveguide 102 and electrically decoupled from one another. However, SO phase controller 526 and TO phase controller 528 are configured such that they are operatively coupled with waveguide 102 such that each can impart a phase change on a light signal propagating through the waveguide by inducing a refractive index change within its materials.

Figure 6:
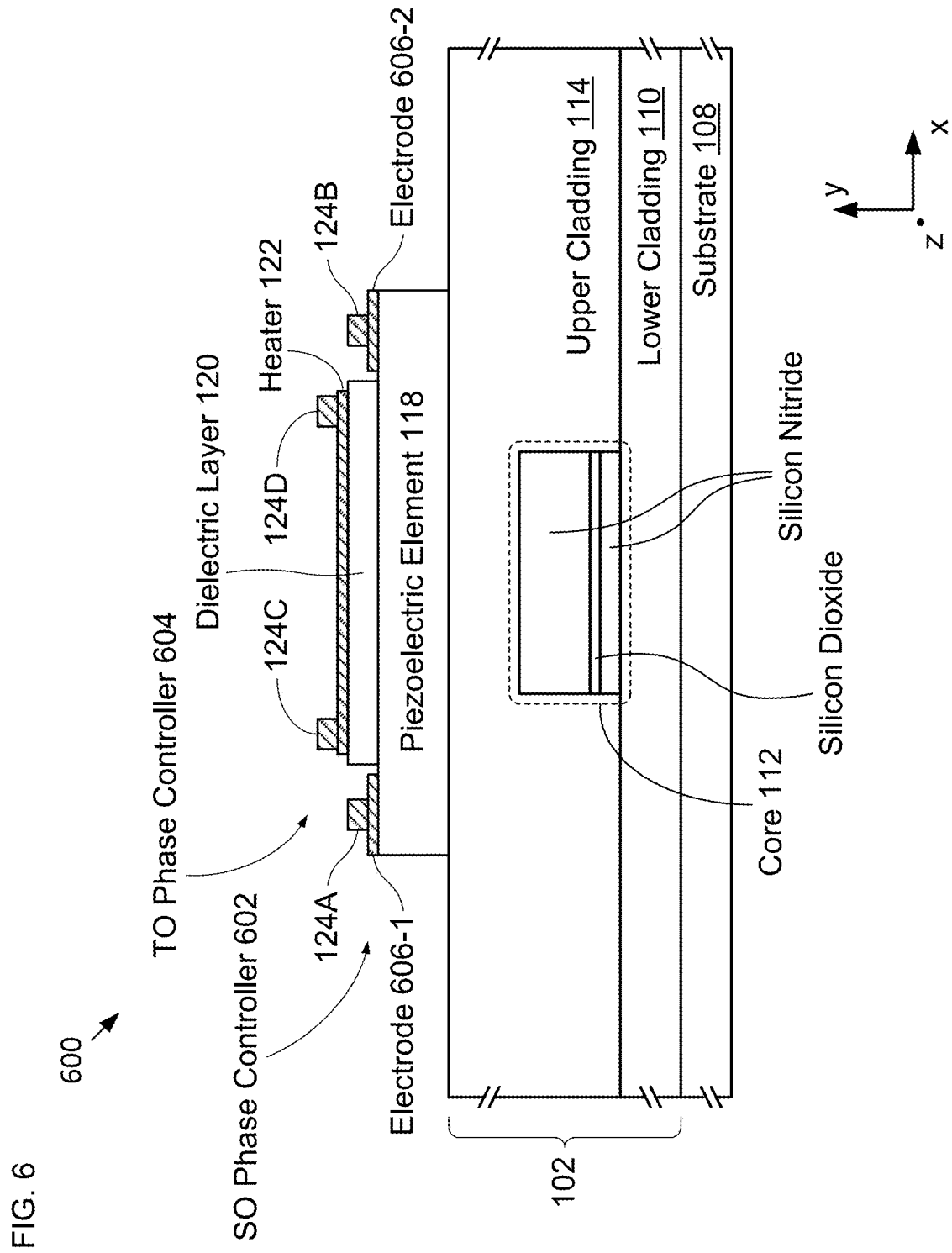
FIG. 6 depicts a schematic drawing of a cross-sectional view of a third alternative composite phase controller in accordance with the present disclosure.

FIG. 6 depicts a schematic drawing of a cross-sectional view of a third alternative composite phase controller in accordance with the present disclosure. Composite phase controller 600 includes surface waveguide 102, SO phase controller 602, and TO phase controller 604.

SO phase controller 602 is configured as a stress-optic phase controller having a top-top electrode configuration. Examples of top-top electrode-based SO phase controllers are described in more detail in U.S. Provisional Patent Application No. 63/280,877, filed Nov. 18, 2021, which is incorporated herein by reference.

SO phase controller 602 includes piezoelectric element 118, which is disposed on upper cladding 114, and electrodes 606-1 and 606-2, each of which is formed on the top surface of piezoelectric layer 118.

In the depicted example, each of electrodes 606-1 and 606-2 comprises platinum and has a width of 10 microns and a thickness of 300 nm.

When a voltage is applied between electrodes 606-1 and 606-2, piezoelectric layer 118 attempts to elongate in the direction of the resultant electric field (i.e., the x-direction as shown), thereby giving rise to tensile stress in the materials of waveguide 102 below it as it pulls the material along the x-direction. In addition, due to volume conservation in piezoelectric element 118 (with the Poisson ratio), the piezoelectric material layer contracts in the directions perpendicular to the electric field (i.e., the y- and z-directions). As a result, the waveguide material is pulled along all three directions.

TO phase controller 604 is analogous to TO phase controller 106 and includes heater 508, which is disposed on dielectric layer 120, which resides on piezoelectric element 118 within the region between electrodes 606-1 and 606-2.

Figure 7:
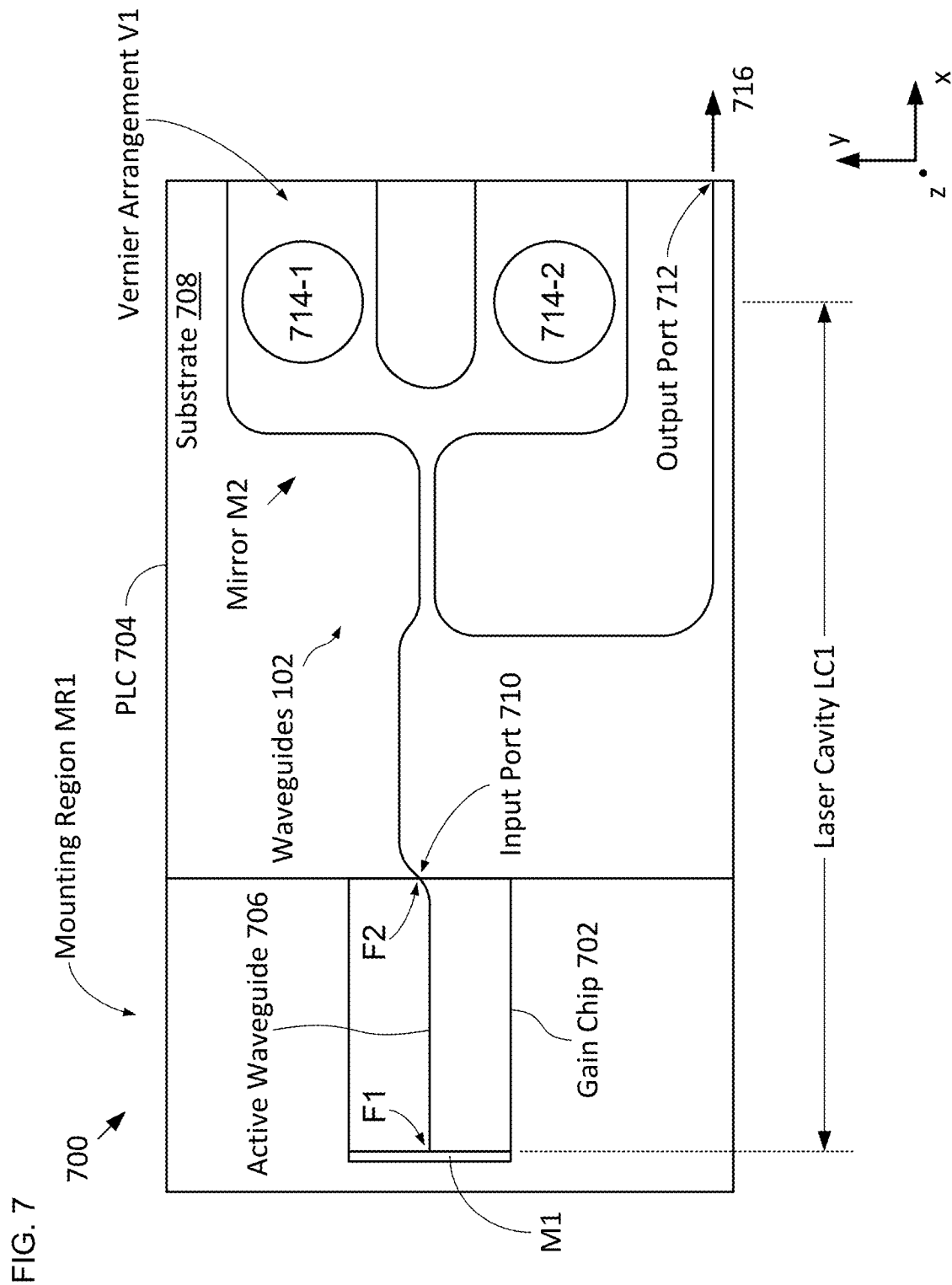
FIG. 7 depicts a schematic drawing of a first exemplary system embodiment that includes a composite phase controller in accordance with the present disclosure.

FIG. 7 depicts a schematic drawing of a first exemplary system embodiment that includes a composite phase controller in accordance with the present disclosure. System 700 is a wavelength-tunable, external-cavity laser that includes gain chip 702 and planar-lightwave circuit (PLC) 704. It should be noted that, although the illustrative embodiment employs the teachings of the present disclosure to realize a tunable laser, the teachings disclosed herein are not limited to such and can be applied to myriad alternative applications.

Gain chip 702 is a conventional gain element suitable for providing optical gain for a light signal. Gain chip 702 includes active waveguide 706 and facets F1 and F2. In the depicted example, gain chip 702 includes a substrate of indium phosphide (InP) that is configured such that active waveguide 706 defines a semiconductor optical amplifier (SOA) having a 700-micron long channel and a gain bandwidth greater than 100 nm centered at 1770 nm.

Facet F1 is polished to define feedback mirror M1, which includes a high-reflectivity (HR) coating having a reflectivity of approximately 90%. In some embodiments, the facet F1 is cleaved, rather than polished, prior to being coated with an HR coating. Facet F2 is coated with an anti-reflection coating configured to mitigate coupling loss between active waveguide 706 and the input port of PLC 704.

Gain chip 702 is joined with PLC 704 via hybrid-integration to collectively define an external-cavity laser configuration. Exemplary methods suitable for joining gain chip 702 and PLC 704 are described in detail by J. P. Epping, et al., in "Hybrid integrated silicon nitride lasers," Proc. SPIE 11274, *Physics and Simulation of Optoelectronic Devices XXVIII*, 112741L (2 Mar. 2020), which is incorporated herein by reference.

PLC 704 comprises a plurality of waveguides 102 disposed on substrate 708. In PLC 704, the waveguides 102 are arranged to define a low-loss optical circuit comprising input port 710, mirror M2, and output port 712.

Substrate 706 is analogous to substrate 108 described above; however, substrate 708 includes mounting region MR1, which is a recessed region configured to locate gain chip 702 such that active waveguide 706 is optically coupled with input port 710. In some embodiments, substrate 708 comprises a different suitable material or materials. In some embodiments, substrate 708 does not include a mounting region. In some embodiments, gain chip 702 and PLC 704 are disposed on a common substrate, such as a multi-chip module chip carrier, optical submount, and the like.

In the depicted example, input port 710 is tapered in two dimensions to match the mode profile of active waveguide 706, which is approximately 3.7 microns by 3.7 microns. Furthermore, input port 710 is angled at 19.87° with respect to its facet to match the angle of the opposing facet of gain chip 702 to reduce coupling loss and spurious reflections at the interface. In similar fashion, in the depicted example, output port 716 is also tapered to match the mode profile of an optical fiber.

Mirror M2 includes composite phase controllers 714-1 and 714-2, each of which is analogous to composite phase controller 100 described above.

Figure 8:
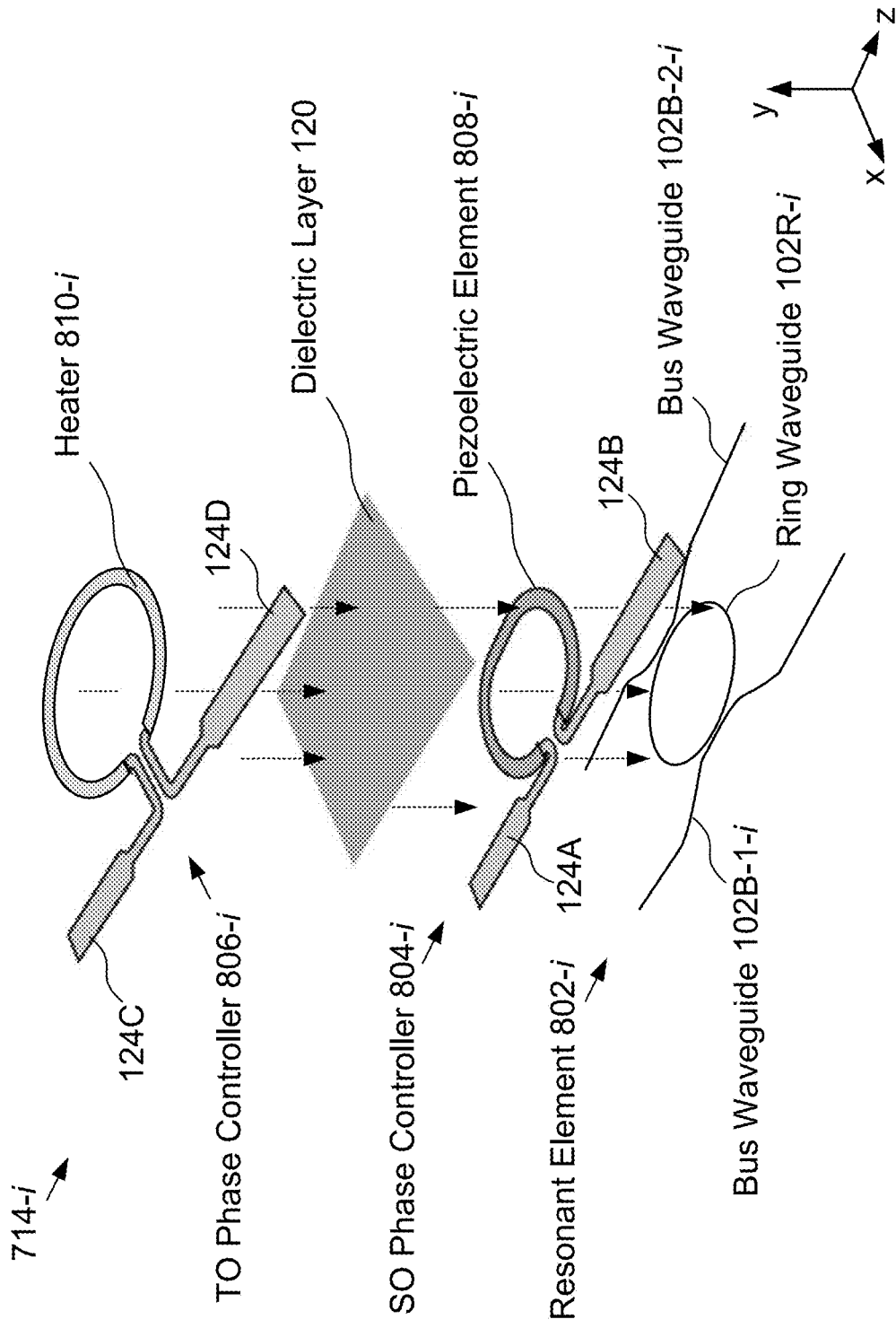
FIG. 8 depicts a schematic drawing of an exploded view of an exemplary composite phase controller 714-i in accordance with the present disclosure.

FIG. 8 depicts a schematic drawing of an exploded view of an exemplary composite phase controller 714-$i$ in accordance with the present disclosure. Composite phase controller 714-$i$ is representative of each of composite phase controllers 714-1 and 714-2. Composite phase controller 714-$i$ comprises resonant element 802-$i$, SO phase controller 804-$i$, and TO phase controller 806-$i$.

Resonant element 802-$i$ is a ring resonator structure that includes ring waveguide 102R-$i$ and bus waveguides 102B-1-$i$ and 102B-2-$i$.

In the depicted example, ring waveguide 102R-$i$ is a racetrack waveguide; however, any closed-loop waveguide shape (e.g., rings, loops, ovals, irregular, etc.) can be used without departing from the scope of the present disclosure.

SO phase controller 804-$i$ is disposed directly on the upper cladding layer of ring waveguide 102R-$i$ and includes piezoelectric element 808-$i$, which is a layer of piezoelectric material patterned to follow the same general shape as ring waveguide 102R-$i$. Piezoelectric element 808-$i$ is sandwiched between a pair of electrodes that are electrically connected with contacts 124A and 124B, as described above. Note that, for clarity, only the piezoelectric element is shown in FIG. 8 and the top and bottom electrodes are excluded from the view.

TO phase controller 804-$i$ includes heater 810-$i$, which is electrically connected with contacts 124C and 124D, as described above. Heater 810-$i$ and the electrodes of SO phase controller 804-$i$ are physically separated by dielectric layer 120 such that they are electrically isolated from one another.

SO phase controller 804-$i$ and TO phase controller 806-$i$ are analogous to SO phase controller 104 and TO phase controller 106 described above; however, heater 810-$i$ and piezoelectric element 808-$i$ (as well as the electrodes of SO phase controller 804-$i$) are disposed on most of the circumference of ring waveguide 102. Preferably, each of SO phase controller 804-$i$ and TO phase controller 806-$i$ is disposed on more than 50% (i.e., at least a majority portion) of ring waveguide 102R-$i$.

In some embodiments, dielectric layer 120 is not included between SO phase controller 804-$i$ and TO phase controller 806-$i$. In such an embodiment, heater 810-$i$ functions as both a heater and the top electrode of SO phase controller 804-$i$. Typically, in such an embodiment, the bottom electrode of the SO phase controller would have a shape analogous to that shown for piezoelectric element 808-$i$ in FIG. 8.

As will be apparent to one skilled in the art, after reading this Specification, the wavelength of light coupled between the ring and bus waveguides, as well as the strength of the coupled signal is based on the refractive index and effective length of ring waveguide 102R-$i$. By employing both TO and SO phase controllers to control the effective length of the ring waveguide, a significantly smaller resonant element structure can be used as compared to one employing only an SO phase controller. In similar fashion, significantly faster tuning (albeit over a smaller spectral range) can be achieved as compared to one employing only a TO phase controller.

For example, a ring resonator having a quiescent path length of approximately 800 microns is characterized by a free-spectral range (FSR) of 1.7 nm, or 210 GHz. Using only stress-optic tuning, a full $2\pi$ phase shift would require a piezoelectric element whose length was 2.1 cm. Given the 800-micron length of the ring resonator, therefore, a phase shift of only $0.08\pi$ can be achieved (which corresponds to a frequency shift of ~8 GHz), but it can be achieved in only a few microseconds. Using only thermo-optic tuning, a nearly full $2\pi$ phase shift can be realized, but would require approximately 250 microseconds. By combining SO and TO tuning in the same device, therefore, coarse wavelength tuning of the laser can be realized on a slow time scale with very fast fine wavelength tuning at the same time. Furthermore, by enabling a shorter path for resonant element 802, a larger FSR can be achieved.

Returning now to FIG. 7, waveguides 102R-1 and 102R-2 of composite phase controllers 714-1 and 714-2 are arranged in Vernier arrangement V1 to define mirror M2. As a result, typically, the roundtrip paths of their respective ring waveguides are different. In the depicted example, composite phase controllers 714-1 and 714-2 are configured such that they are arranged in an add-drop configuration and ring waveguides have slightly different circumferences of 857.5 and 885.1 microns, respectively. Therefore, composite phase controller 714-1 has a free-spectral range (FSR) of 1.58 nm and composite phase controller 714-2 has an FSR of 1.63 nm. As a result, by virtue of the Vernier effect, mirror M2 has a total FSR of 50.6 nm.

It should be noted that, in some embodiments, the closed-loop waveguides of more than two composite phase controllers are included in a Vernier arrangement.

By controlling the refractive index of the materials of ring waveguides 102R, composite phase controllers 714-1 and 714-2 are optically coupled and tunable to control the reflectivity/transmittivity of mirror M2 to any wavelength within its total FSR.

The frequency-selective reflectivity of mirror M2 defines a single longitudinal mode for laser cavity LC1, which is defined by the separation between mirrors M1 and M2. In other words, laser cavity LC1 includes the length of gain chip 502 (i.e., the distance between facets F1 and F2) and the portion of PLC 504 between input port 710 and mirror M2. In the depicted example, cavity length LC1 is several centimeters; therefore, the linewidth of output signal 516 of system 500 is in the single-kHz-range.

Figure 9:
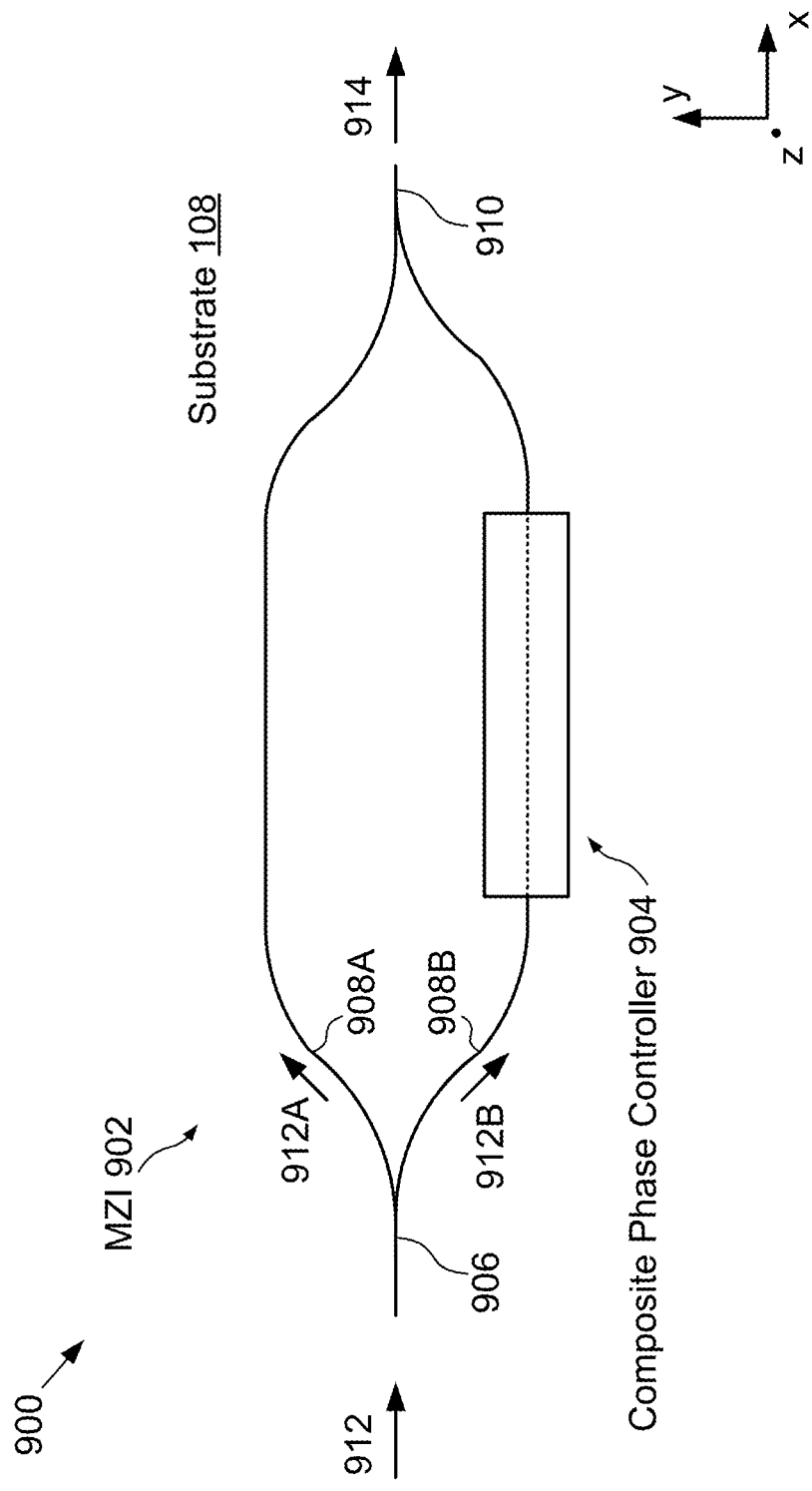
FIG. 9 depicts a schematic drawing of a top view of a second exemplary system embodiment that includes a composite phase controller in accordance with the present disclosure.

FIG. 9 depicts a schematic drawing of a top view of a second exemplary system embodiment that includes a composite phase controller in accordance with the present disclosure. System 900 is an integrated-optics switch and variable optical attenuator (VOA) that includes Mach-Zehnder Interferometer 902 and phase controller 904. Although the depicted example is a PLC comprising an integrated-optics switch/VOA, myriad alternative integrated-optics systems are possible within the scope of the present disclosure.

Mach-Zehnder Interferometer (MZI) 902 includes input waveguide 906, arms 908A and 908B, and output waveguide 910, which are arranged such that, as light signal 912 propagates through input waveguide 906, its optical energy is split equally into light signals 912A and 912B, which propagate through arms 908A and 908B, respectively, to output waveguide 910 where they combine to form output signal 914.

In the depicted example, the lengths of arms 908A and 908B are designed such that light signals 912A and 912B are in phase and constructively combine at output waveguide 910 when phase controller 904 is in its quiescent state. As a result, when no control voltage is applied to phase controller 904, the intensity of output signal 914 is substantially equal to the intensity of input signal 912 (neglecting propagation loss in the waveguides of MZI 902). In some embodiments, arms 908A and 908B have unequal lengths such that the light signals are not in phase when recombined, thereby defining an asymmetric MZI (aMZI).

Phase controller 904 is a composite phase controller analogous to composite phase controller 100 described above.

When phase controller 904 is activated, it induces a refractive-index change in the waveguide structure of arm 908B, which gives rise to a change in the speed at which light signal 912B travels through the arm. The magnitude of this induced refractive-index change determines the phase difference between light signals 912A and 912B when they recombine, thereby enabling control over the magnitude of output signal 914.

It is to be understood that the disclosure teaches just one example of the illustrative embodiment and that many variations of embodiments in accordance with the present disclosure can easily be devised by those skilled in the art after reading this disclosure and that the scope of the present invention is to be determined by the following claims.

What is claimed is:

1. An apparatus comprising a first composite phase controller including:
a first waveguide disposed on a substrate;
a first stress-optic (SO) phase controller that is disposed on the first waveguide and configured to control a first stress in the first waveguide, wherein the first SO phase controller includes a first piezoelectric element disposed between a first pair of electrodes; and
a first thermo-optic (TO) phase controller disposed on the first waveguide and configured to control a first temperature of the first waveguide.

2. The apparatus of claim 1 wherein the first SO phase controller is between the first waveguide and the first TO phase controller.

3. The apparatus of claim 1 wherein the first TO phase controller is between the first waveguide and the first SO phase controller.

4. The apparatus of claim 1 wherein the TO phase controller and the SO controller are nested such that one of the first SO and first TO phase controller is located inside the circumference of the other one of the first SO and first TO phase controller.

5. The apparatus of claim 1 wherein the first waveguide includes a projection, and wherein the first SO phase controller is disposed on at least a portion of the projection.

6. The apparatus of claim 1 wherein first waveguide is at least a portion of a first resonant element.

7. The apparatus of claim 1 further comprising:
a Mach-Zehnder Interferometer (MZI) having a first arm and a second arm that includes the first composite phase controller;
an input port configured to distribute an input signal into a first light signal in the first arm and a second light signal in the second arm; and
an output port configured to combine the first and second light signals into an output signal after the second light signal has passed through the first composite phase controller.

8. The apparatus of claim 1 further comprising a planar-lightwave circuit (PLC) that includes the first waveguide.

9. The apparatus of claim 8 wherein the apparatus further comprises a laser that is wavelength tunable, and wherein the laser includes:
a gain chip having a first mirror having a first reflectivity;
the PLC, wherein the PLC is optically coupled with the gain chip, the PLC comprising a second mirror having a second reflectivity at a first wavelength that is controllable, wherein the first and second mirror collectively define a laser cavity for the laser;
wherein the second mirror includes:
the first composite phase controller, wherein the first waveguide is at least a portion of a first resonant element; and
a second composite phase controller comprising a second waveguide that is at least a portion of a second resonant element;
wherein the first and second composite phase controllers are arranged such that the first and second resonant elements are included in a Vernier arrangement having a first free-spectral range; and
wherein the first and second composite phase controllers are operative for controlling the first wavelength within the first free-spectral range.

10. A method comprising:
providing a first composite phase controller that includes:
a first waveguide disposed on a substrate;
a first stress-optic (SO) phase controller that is disposed on the first waveguide and configured to control a first stress in the first waveguide, wherein the first SO phase controller includes a first piezoelectric element disposed between a first pair of electrodes; and a first thermo-optic (TO) phase controller disposed on the first waveguide and configured to control a first temperature of the first waveguide;

optically coupling a first light signal into the first waveguide; and controlling at least one of the first SO phase controller and first TO phase controller to control a propagation characteristic of the first light signal in the first waveguide.

11. The method of claim 10 wherein the first composite phase controller is provided by operations that include:

providing the first waveguide;

forming the first SO phase controller on the first waveguide;

forming a first dielectric layer on the first SO phase controller; and forming the first TO phase controller on the first dielectric layer.

12. The method of claim 10 wherein the first composite phase controller is provided by operations that include:

providing the first waveguide;

forming the first TO phase controller on the first waveguide;

forming a first dielectric layer on the first TO phase controller; and forming the first SO phase controller on the first dielectric layer.

13. The method of claim 10 wherein the first composite phase controller is provided by operations that include:

providing the first waveguide; and forming each of the first TO phase controller and first SO phase controller on the first waveguide; and wherein the first TO phase controller and first SO phase controller are configured such that one of the first SO and first TO phase controller is located inside the circumference of the other one of the first SO and first TO phase controller.

14. The method of claim 10 wherein the first waveguide is provided such that it includes a first projection, and wherein at least a portion of the first SO phase controller is disposed on the first projection.

15. The method of claim 10 wherein the first waveguide is provided such that it is at least a part of a first resonant element.

16. The method of claim 10 wherein the first waveguide is provided such that it is at least a part of a first planar-lightwave circuit (PLC).

17. The method of claim 10 wherein the first waveguide is provided such that it is a first closed-loop waveguide, and wherein the first SO phase controller is disposed on a majority portion of the first waveguide, and further wherein the first TO phase controller is disposed on at least a majority portion of the first waveguide.

18. The method of claim 17 further comprising:

providing a gain chip that includes a first mirror having a first reflectivity;

providing a first planar-lightwave circuit (PLC) that comprises the first composite controller and the second composite controller, the second composite controller including:

a second waveguide that is a second closed-loop waveguide;

a second SO phase controller that is disposed on the second waveguide and configured to control a second stress in the second waveguide, wherein the second SO phase controller includes a second piezoelectric element disposed between a second pair of electrodes; and a second TO phase controller disposed on the second waveguide and configured to control a second temperature of the second waveguide;

wherein the first and second waveguides are arranged in a Vernier arrangement that defines a second mirror having a second reflectivity at a first wavelength that is controllable;

optically coupling the gain chip and the first PLC, wherein the gain chip and first PLC collectively define a laser having an output signal that is wavelength tunable;

generating the output signal; and controlling at least one of the first and second composite phase controllers to control the wavelength of the output signal.

19. The apparatus of claim 10 further comprising:

providing an input signal to a Mach-Zehnder Interferometer (MZI) having a first arm and a second arm that includes the first waveguide;

distributing the input signal into a first light signal in the first arm and a second light signal in the second arm;

controlling the phase of the second light signal at the first composite phase controller; and recombining the first and second light signals into an output signal.

* * * * *